United States Patent [19]

Itoh et al.

[11] 4,397,275
[45] Aug. 9, 1983

[54] IDLING SPEED CONTROL DEVICE OF AN INTERNAL COMBUSTION ENGINE

[75] Inventors: Hiroshi Itoh, Nagoya; Haruo Watanabe, Okazaki; Mamoru Kobashi, Aichi, all of Japan

[73] Assignee: Toyota Jidosha Kogyo Kabushiki Kaisha, Toyota, Japan

[21] Appl. No.: 239,641

[22] Filed: Mar. 2, 1981

[30] Foreign Application Priority Data

Sep. 17, 1980 [JP] Japan .................. 55-131118[U]

[51] Int. Cl.³ .................................................. F02M 3/00
[52] U.S. Cl. ........................................ 123/339; 123/585; 310/49 R; 74/89.15
[58] Field of Search ............... 123/339, 440, 489, 585, 123/588, 556, 539; 310/49, 257, 181; 74/89, 89.15

[56] References Cited

U.S. PATENT DOCUMENTS

| | | |
|---|---|---|
| 3,217,192 | 11/1965 | Feightner .................. 310/49 R |
| 3,504,253 | 2/1970 | Kavanaugh . |
| 3,549,918 | 4/1970 | Croymans . |
| 3,558,941 | 1/1971 | Brebbia et al. ............... 310/49 |
| 3,661,131 | 6/1972 | Croft . |
| 3,693,034 | 9/1972 | Inariba ....................... 310/49 |
| 3,793,896 | 2/1974 | Price et al. ................. 74/89.15 |
| 3,960,130 | 7/1976 | Peterson . |
| 3,964,457 | 1/1976 | Coscia . |
| 3,989,223 | 11/1976 | Burkhardt et al. ........... 74/89.15 |
| 4,072,137 | 4/1978 | Hattori . |
| 4,074,157 | 2/1978 | Lace ........................ 310/257 |
| 4,106,451 | 2/1978 | Hattori et al. . |
| 4,145,165 | 7/1979 | Perkins . |
| 4,173,957 | 3/1979 | Hattori et al. . |
| 4,175,521 | 5/1979 | Hattori et al. . |
| 4,203,395 | 11/1980 | Cromas . |
| 4,237,833 | 8/1980 | Des Lauriers . |
| 4,285,319 | 8/1981 | Hattori et al. ............... 123/585 |
| 4,291,656 | 9/1981 | Miyagi . |
| 4,294,217 | 5/1981 | Glockler . |
| 4,303,048 | 12/1981 | Nishio ....................... 123/339 |

FOREIGN PATENT DOCUMENTS

| | | | |
|---|---|---|---|
| 2846865 | 4/1980 | Fed. Rep. of Germany ...... 123/588 |
| 605040 | 5/1978 | U.S.S.R. ........................ 123/585 |

*Primary Examiner*—Parshotam S. Lall
*Attorney, Agent, or Firm*—Cushman, Darby & Cushman

[57] ABSTRACT

An idling speed control device of an internal combustion engine comprising a bypass passage which interconnects the intake passage located upstream of the throttle valve to the intake passage located downstream of the throttle valve. A flow control valve is arranged in the bypass passage and actuated by a step motor for controlling the amount of air flowing within the bypass passage to maintain the idling speed of an engine at a predetermined speed. A cooling water passage is formed in the valve housing of the flow control valve.

10 Claims, 13 Drawing Figures

IDLING SPEED CONTROL DEVICE OF AN INTERNAL COMBUSTION ENGINE

DESCRIPTION OF THE INVENTION

The present invention relates to an idling speed control device of an internal combustion engine.

An idling speed control device has been known in which a bypass passage is branched off from the intake passage of an engine, which is located upstream of a throttle valve, and connected again to the intake passage located downstream of the throttle valve, and a diaphragm type vacuum operated control valve device is arranged in the bypass passage. The diaphragm vacuum chamber of the control valve device is connected via a vacuum conduit to the intake passage located downstream of the throttle valve, and an electromagnetic control valve is arranged in the vacuum conduit for controlling the cross-sectional area of the vacuum conduit. In this idling speed control device, at the time of idling, the level of the vacuum produced in the diaphragm vacuum chamber of the control valve device is controlled by controlling the electromagnetic control valve in accordance with the operating condition of the engine and, in addition, the air flow area of the bypass passage is controlled in accordance with a change in the level of the vacuum produced in the diaphragm vacuum chamber. As a result of this, the amount of air fed into the cylinders of the engine from the bypass passage is controlled. However, in such a conventional idling speed control device, firstly, in the case wherein a vehicle is used in a cold region, the electromagnetic control valve becomes frozen and, thus, it is impossible to control the cross-sectional area of the vacuum conduit. As a result of this, since it is also impossible to control the air flow area of the bypass passage, a problem occurs in that it is impossible to control the amount of air fed into the cylinders from the bypass passage. Secondly, in a conventional idling speed control device, since the diaphragm type vacuum operated control valve device is used, the controllable range of the air flow area of the bypass passage is very narrow. Therefore, even if the control valve device is fully opened, air, the amount of which is necessary to operate the engine at the time of fast idling, cannot be fed into the cylinders of the engine from the bypass passage. Consequently, in a conventional idling speed control device, an additional bypass passage is provided in addition to the regular bypass passage, and a valve, which is actuated by a bimetallic element, is arranged in the additional bypass passage. When the temperature of the engine is low, the valve, which is actuated by the bimetallic element, opens. As a result, since additional air is fed into the cylinders of the engine from the additional bypass passage in addition to the air fed into the cylinders of the engine from the regular bypass passage, the amount of air, which is necessary to operate the engine at the time of fast idling, can be ensured. As mentioned above, in a conventional idling speed control device, since the additional bypass passage and the valve, actuated by the bimetallic element, are necessary in addition to the regular bypass passage, a problem occurs in that the construction of the idling speed control device will be complicated. In addition, since the amount of air fed into the cylinders of the engine is controlled by only the expanding and shrinking action of the bimetallic element at the time of fast idling, there is a problem in that it is impossible to precisely control the amount of air fed into the cylinders of the engine.

An object of the present invention is to provide an idling speed control device which has a novel construction and is capable of precisely controlling the amount of air flowing within the bypass passage at the time of idling and maintaining the idling speed of the engine at an optimum speed.

According to the present invention, there is provided an idling speed control device of an internal combustion engine having an intake passage and a throttle valve arranged in the intake passage, said device comprising: a bypass passage interconnecting the intake passage located upstream of the throttle valve to the intake passage located downstream of the throttle valve; valve means arranged in said bypass passage and having a control valve controlling a flow area of said bypass passage, said valve means having a valve housing and a hot fluid passage formed in said valve housing, and; a step motor connected to said control valve for controlling the amount of air flowing within said bypass passage in accordance with a change in an operating condition of the engine at the time of idling.

The present invention may be more fully understood from the description of a preferred embodiment of the invention set forth below, together with the accompanying drawings.

DESCRIPTION OF A PREFERRED EMBODIMENT

Figure 1:
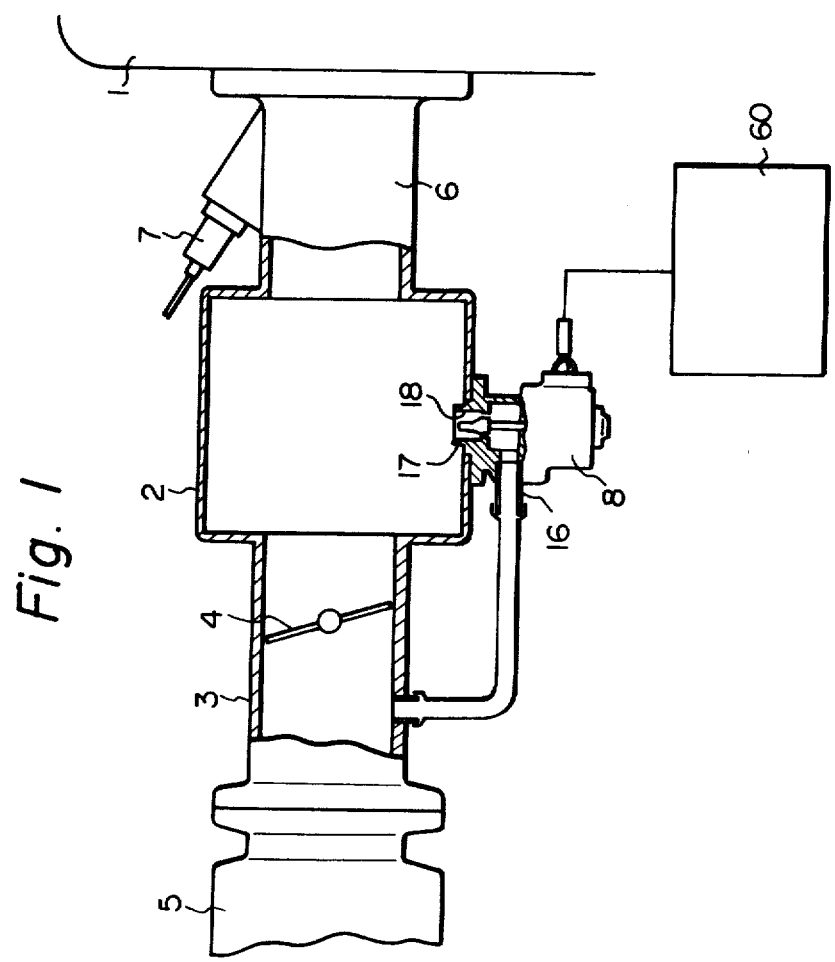
FIG. 1 is a side view, partly in cross-section, of an intake system equipped with an idling speed control device according to the present invention.
Figure 2:
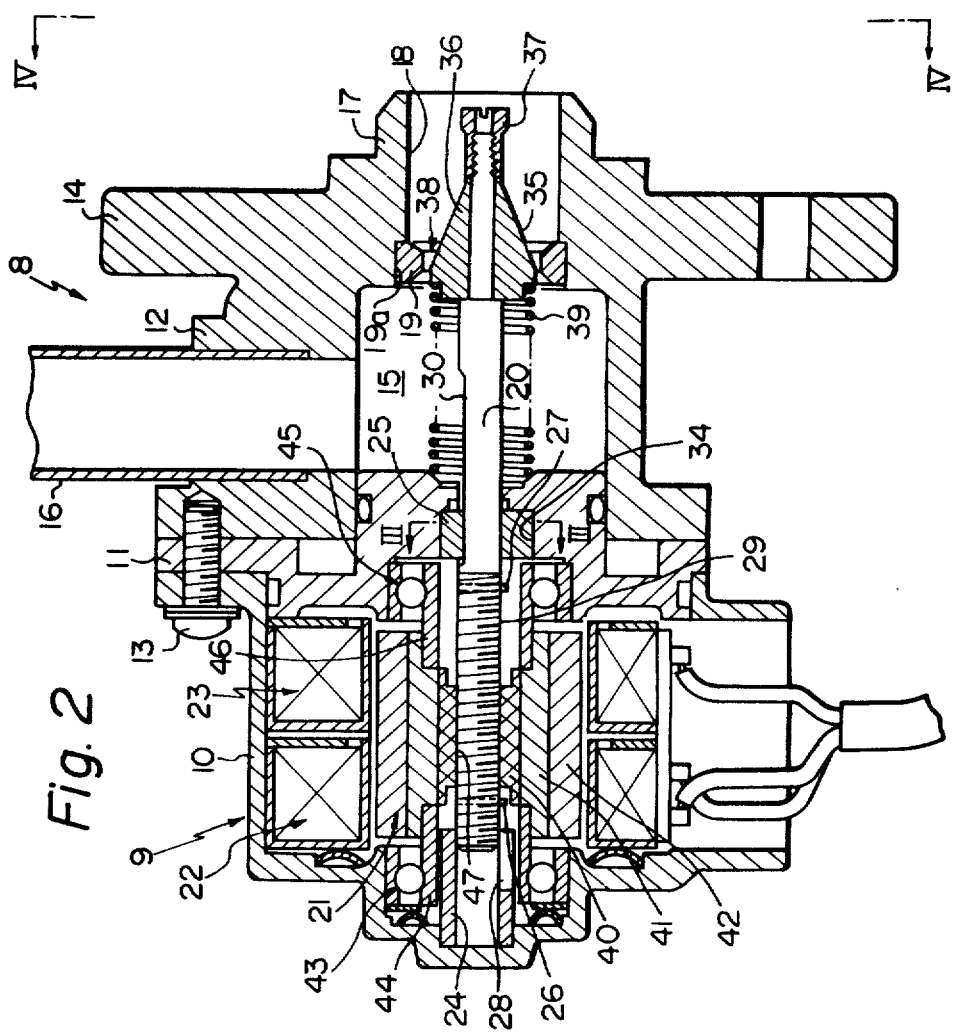
FIG. 2 is a cross-sectional side view of a flow control valve device.
Figure 4:
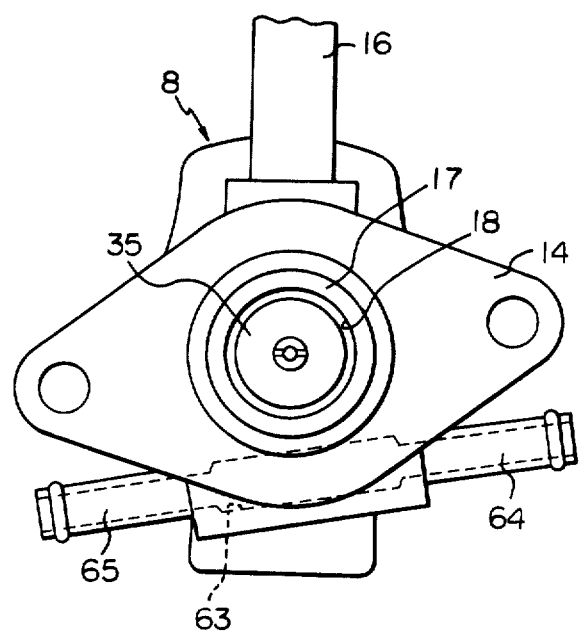
FIG. 4 is a side view taken along the line IV—IV in FIG. 2.
Figure 5:
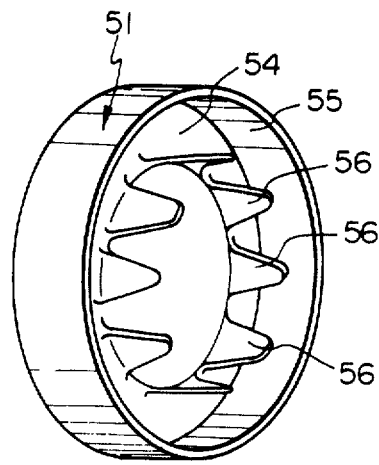
FIG. 5 is a perspective view of a stator core member.
Figure 6:
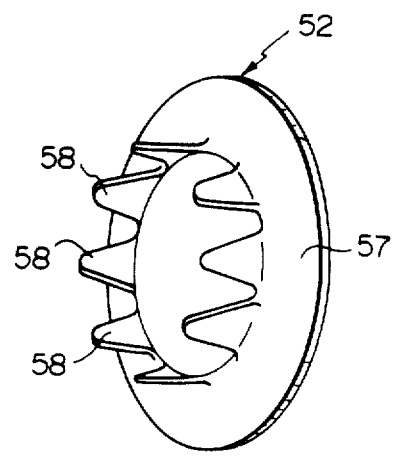
FIG. 6 is a perspective view of a stator core member.

Referring to FIG. 1, 1 designates an engine body, 2 a surge tank, 3 an intake duct, 4 a throttle valve and 5 an air flow meter. The inside of the intake duct 3 is connected to the atmosphere via the air flow meter 5 and an air cleaner (not shown). The surge tank 2, which is common to all the cylinders of the engine, has a plurality of branch pipes 6, each being connected to the corresponding cylinder of the engine. A fuel injector 7 is provided for each cylinder and mounted on the corresponding branch pipe 6. In addition, a flow control valve device 8 is mounted on the surge tank 2. As illustrated in FIG. 2, the flow control valve device 8 comprises a motor housing 10 of a step motor 9, a motor housing end plate 11 and a valve housing 12. The motor housing 10, the end plate 11 and the valve housing 12 are interconnected to each other by means of bolts 13. As illustrated in FIGS. 1 and 4, a flange 14 is formed in one piece on the valve housing 12 and fixed onto the outer wall of the surge tank 2. A valve chamber 15 is formed in the valve housing 12 and connected via a bypass pipe 16, fixed onto the valve housing 12, to the inside of the intake duct 3, which is located upstream of the throttle valve 4. In addition, a hollow cylindrical projection 17, projecting into the surge tank 2, is formed in one piece on the side wall of the flange 14, and a cylindrical air outflow bore 18 is formed in the hollow cylindrical projection 17. An annular groove 19a is formed on the inner end of the air outflow bore 18, and a valve seat 19 is fitted into the annular groove 19a.

Figure 3:
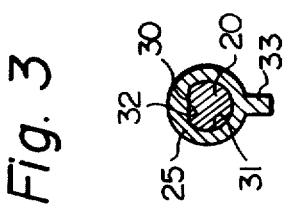
FIG. 3 is a cross-sectional view taken along the line III—III in FIG. 2.

As illustrated in FIG. 2, the step motor 9 comprises a valve shaft 20, a rotor 21 coaxially arranged with the valve shaft 20, and a pair of stators 22, 23, each being stationarily arranged in the motor housing 10 and spaced from the cylindrical out wall of the rotor 21 by a slight distance. The end portion of the valve shaft 20 is supported by a hollow cylindrical bearing 24 made of a sintered metal and fixed onto the motor housing 10, and the intermediate portion of the valve shaft 20 is supported by a hollow cylindrical bearing 25 made of a sintered metal and fixed onto the end plate 11. A first stop pin 26, which abuts against the rotor 21 when the valve shaft 20 reaches the most advanced position, is fixed onto the valve shaft 20, and a second stop pin 27, which abuts against the rotor 21 when the valve shaft 20 reaches the most retracting position, is fixed onto the valve shaft 20. In addition, an axially extending slot 28, into which the first stop pin 26 is able to enter, is formed in the bearing 24. External screw threads 29 are formed on the outer circumferential wall of the valve shaft 20, which is located within the motor housing 10. The external screw threads 29 extend towards the right in FIG. 2 from the left end of the valve shaft 20 and terminate at a position wherein the valve shaft 20 passes through the second stop pin 27 by a slight distance. In addition, an axially extending flat portion 30, which extends towards the right in FIG. 2 from a position near the terminating position of the external screw threads 29, is formed on the outer circumferential wall of the valve shaft 20. As illustrated in FIG. 3, the inner wall of the shaft bearing hole of the bearing 25 comprises a cylindrical wall portion 31 and a flat wall portion 32 which have a complementary shape relative to the outer circumferential wall of the valve shaft 20. Consequently, the valve shaft 20 is supported by the bearing 25 so that the valve shaft 20 cannot be rotated, but is able to slide in the axial direction. In addition, as illustrated in FIG. 3, an outwardly projecting arm 33 is formed in one piece on the outer circumferential wall of the bearing 25, and a bearing receiving hole 34 (FIG. 2), having a contour shape which is the same as that of the bearing 25, is formed on the inner wall of the end plate 11. Consequently, when the bearing 25 is fitted into the bearing receiving hole 34, as illustrated in FIG. 2, the bearing 25 is non-rotatably supported by the end plate 11. A valve head 36, having a substantially conical shaped outer wall 35, is secured onto the tip of the valve shaft 20 by means of a nut 37, and an annular air flow passage 38 is formed between the valve seat 19 and the conical outer wall 35 of the valve head 36. In addition, a compression spring 39 is inserted between the valve head 36 and the end plate 11 in the valve chamber 15.

As illustrated in FIG. 2, the rotor 21 comprises a hollow cylindrical inner body 40 made of a synthetic resin, a hollow cylindrical intermediate body 41 made of a metallic metal and rigidly fitted onto the outer circumferential wall of the hollow cylindrical inner body 40, and a hollow cylindrical outer body 42 made of a permanent magnet and fixed onto the outer circumferential wall of the hollow cylindrical intermediate body 41 by using an adhesive. As will be hereinafter described, a N pole and a S pole are alternately formed on the outer circumferential wall of the hollow cylindrical outer body 42 made of a permanent magnet along the circumferential direction of the outer circumferential wall of the hollow cylindrical outer body 42. As illustrated in FIG. 2, one end of the hollow cylindrical intermediate body 41 is supported by the inner race 44 of the ball bearing 43 which is supported by the motor housing 10, and the other end of the hollow cylindrical intermediate body 41 is supported by the inner race 46 of a ball bearing 45 which is supported by the end plate 11. Consequently, the rotor 21 is rotatably supported by a pair of the ball bearings 43 and 45. Internal screw threads 47, which are in engagement with the external screw threads 29 of the valve shaft 20, are formed on the inner wall of the central bore of the hollow cylindrical inner body 40. Therefore, when the rotor 21 rotates, the valve shaft 20 is caused to move in the axial direction.

Figure 7:
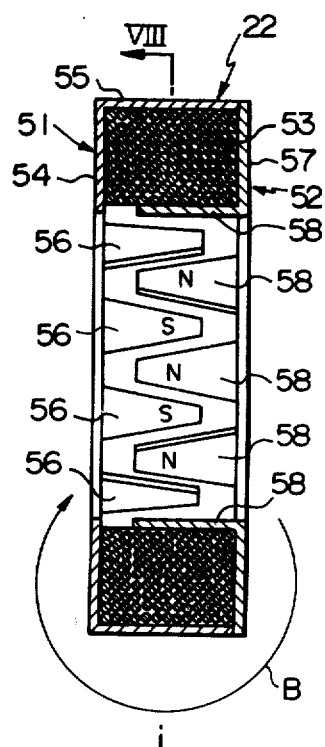
FIG. 7 is a cross-sectional side view of a stator.
Figure 8:
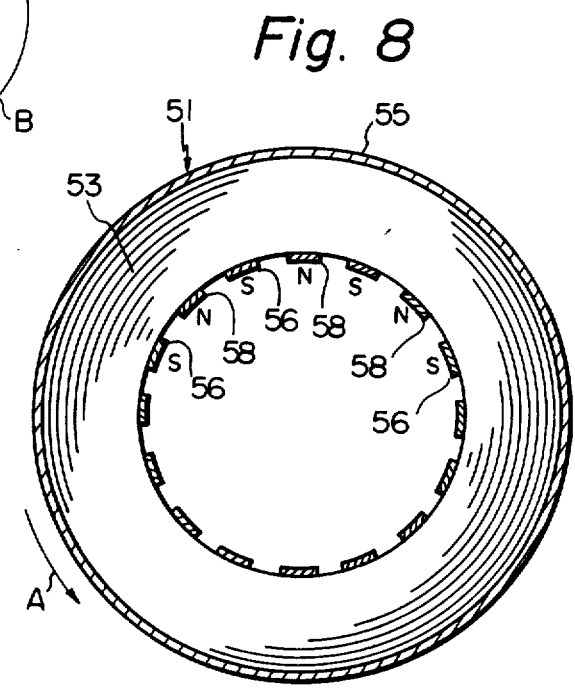
FIG. 8 is a cross-sectional view taken along the line VIII—VIII in FIG. 7.

The stators 22 and 23, which are stationarily arranged in the motor housing 10, have the same construction and, therefore, the construction of only the stator 22 will be hereinafter described with reference to FIGS. 5 through 8. Referring to FIGS. 5 through 8, the stator 22 comprises a pair of stator core members 51 and 52, and a stator coil 53. The stator core member 51 comprises an annular side wall portion 54, an outer cylindrical portion 55, and eight pole pieces 56 extending perpendicular to the annular side wall portion 54 from the inner periphery of the annular side wall portion 54. The pole pieces 56 have a substantially triangular shape, and each of the pole pieces 56 is spaced from the adjacent pole piece 56 by the same angular distance. On the other hand, the stator core member 52 comprises an annular side wall portion 57 and eight pole pieces 58 extending perpendicular to the annular side wall portion 57 from the inner periphery of the annular side wall portion 57. The pole pieces 58 have a substantially triangular shape, and each of the pole pieces 58 is spaced from the adjacent pole piece 58 by the same angular distance. The stator core members 51 and 52 are assembled so that each of the pole pieces 56 is spaced from the adjacent pole piece 58 by the same angular distance as illustrated in FIGS. 7 and 8. When the stator core members 51 and 52 are assembled, the stator core members 51 and 52 construct a stator core. When an electric current is fed into the stator coil 53 and flows within the stator coil 53 in the direction illustrated by the arrow A in FIG. 8, a magnetic field, the direction of which is as illustrated by the arrow B in FIG. 7, generates around the stator coil 53. As a result of this, the S poles are produced in the pole pieces 56 and, at the same time, the N poles are produced in the pole pieces 58. Consequently, it will be understood that the N pole and the S pole are alternately formed on the inner circumferential wall of the stator 22. On the other hand, if an electric current flows within the stator coil 22 in the direction which is opposite to that illustrated by the arrow A in FIG. 8, the N poles are produced in the pole pieces 56 and, at the same time, the S poles are produced in the pole pieces 58.

Figure 9:
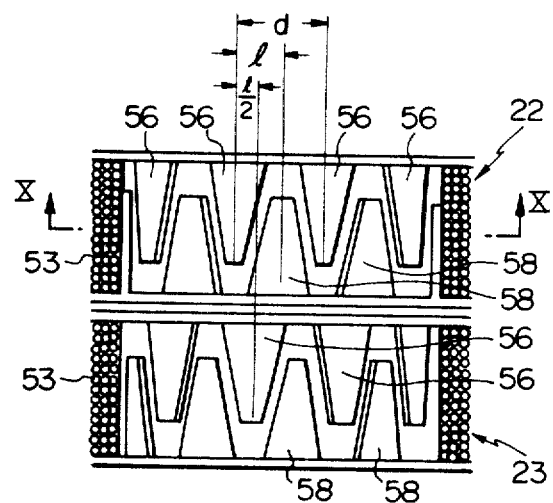
FIG. 9 is a cross-sectional plan view of the stator illustrated in FIG. 2.
Figure 10:
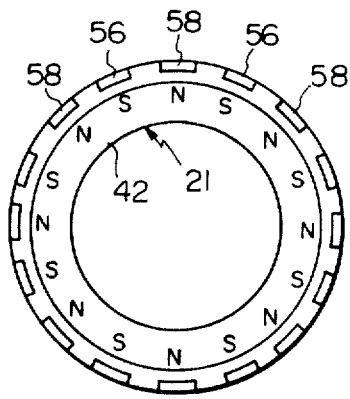
FIG. 10 is a schematic cross-sectional side view taken along the line X—X in FIG. 9.

FIG. 9 illustrates the case wherein the stators 22 and the stator 23 are arranged in tandem as illustrated in FIGS. 2. In FIG. 9, similar components of the stator 23 are indicated with the same reference numerals used in the stator 22. As illustrated in FIG. 9, assuming that the distance between the pole piece 56 of the stator 22 and the adjacent pole piece 58 of the stator 22 is indicated by l, each of the pole pieces 56 of the stator 23 is offset by 1/2 from the pole piece 56 of the stator 22, which is arranged nearest to the pole piece 56 of the stator 23. That is, assuming that the distance d between the adjacent pole pieces 56 of the stator 23 is one pitch, each of the pole pieces 56 of the stator 23 is offset by a ¼ pitch from the pole piece 56 of the stator 22, which is arranged nearest to the pole piece 56 of the stator 23. On the other hand, as illustrated in FIG. 10, the N pole and the S pole are alternately formed on the outer circumferential wall of the hollow cylindrical outer body 42 of the rotor 21 along the circumferential direction of the outer circumferential wall of the hollow cylindrical outer body 42, and the distance between the N pole and the S pole, which are arranged adjacent to each other, is equal to the distance between the pole piece 56 and the pole piece 58 of the stator 22 or 23, which are arranged adjacent to each other.

Figure 11:
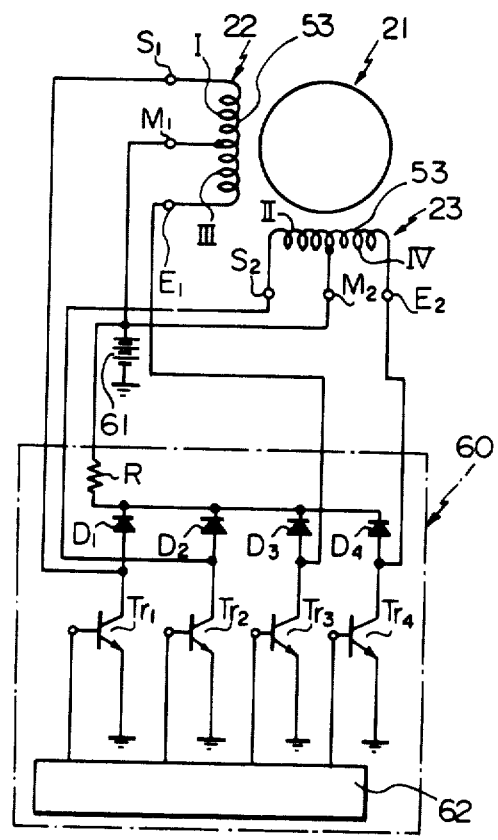
FIG. 11 is a drive control circuit diagram of a step motor.

FIG. 11 illustrates a drive control circuit for the step motor 9 illustrated in FIG. 2. In FIG. 9, the stator coil 53 of the stator 22 is wound in the direction which is the same as the winding direction of the stator coil 53 of the stator 23. In FIG. 11, the winding start terminals of the stator coils 53 of the stators 22 and 23 are indicated by $S_1$ and $S_2$, respectively, and the winding end terminals of the stator coils 53 of the stators 22 and 23 are indicated by $E_1$ and $E_2$, respectively. In addition, in FIG. 11, the intermediate taps of the stator coils 53 of the stators 22 and 23 are indicated by $M_1$ and $M_2$, respectively. In the start terminal $S_1$ and the intermediate tap $M_1$, constructs a first phase exciting coil I, and the stator coil 53, located between the winding end terminal $E_1$ and the intermediate tap $M_1$, constructs a second phase exciting coil II. In addition, in the stator 23, the stator coil 53, located between the winding start terminal $S_2$ and the intermediate terminal $M_2$, constructs a third phase exciting coil III, and the stator coil 53, located between the wnding end terminal $E_2$ and the intermediate tap $M_2$, constructs a fourth phase exciting coil IV. As illustrated in FIG. 11, the drive control circuit 60 comprises four transistors $Tr_1$, $Tr_2$, $Tr_3$ and $Tr_4$, and the winding start terminals $S_1$ and $S_2$ and the winding end terminals $E_1$ and $E_2$ are connected to the collectors of the transistor $Tr_1$, $Tr_2$, $Tr_3$ and $Tr_4$, respectively. In addition, the intermediate taps $M_1$ and $M_2$ are grounded via a power source 61. The collectors of the transistor $Tr_1$, $Tr_2$, $Tr_3$ and $Tr_4$ are connected to the power source 61 via corresponding diodes $D_1$, $D_2$, $D_3$ and $D_4$ for absorbing a surge current and via a resistor R, and the emitters of the transistor $Tr_1$, $Tr_2$, $Tr_3$ and $Tr_4$ are grounded. In addition, the bases of the transistors $Tr_1$, $Tr_2$, $Tr_3$ and $Tr_4$ are connected to a control pulse generating circuit 62.

Figure 12:
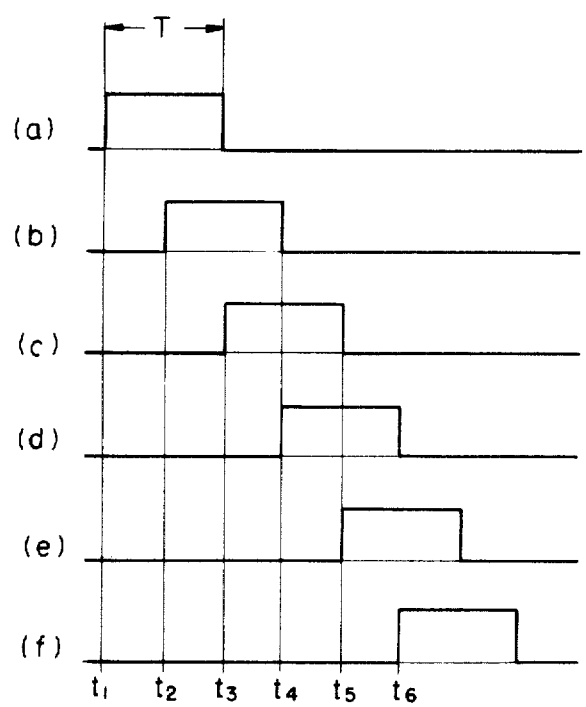
FIG. 12 is a time chart of control pulses of a step motor.

FIG. 12 illustrates control pulses applied to the base of the transistors $Tr_1$, $Tr_2$, $Tr_3$ and $Tr_4$ from the control pulse generating circuit 62. FIG. 12(a) and FIG. 12(e) indicate the control pulses applied to the base of the transistor $Tr_1$; FIG. 12(b) and FIG. 12(f) indicate the control pulses applied to the base of the transistor $Tr_2$; FIG. 12(c) indicates the control pulse applied to the base of the transistor $Tr_3$, and; FIG. 12(d) indicates the control pulse applied to the base of the transistor $Tr_4$. When the control pulse is applied to the base of the transistor $Tr_1$ as illustrated in FIG. 12(a), since the transistor $Tr_1$ is turned to the ON condition, the first phase exciting coil I is excited. In addition, as illustrated in FIGS. 12(b), 12(c) and 12(d), when the control pulse is applied to the bases of the transistors $Tr_2$, $Tr_3$ and $Tr_4$, the second phase exciting coil II, the third phase exciting coil III and the fourth phase exciting coil IV are excited, respectively. Consequently, when the control pulse is successively applied to the bases of the transistors $Tr_1$, $Tr_2$, $Tr_3$ and $Tr_4$, the exciting coils I, II, III and IV are successively excited. From FIG. 12, it will be understood that the widths of all the control pulses are the same, and each of the control pulses generates at the same time interval. In addition, as illustrated in FIG. 12, only the control pulse for the first phase exciting coil I generates between the time $t_1$ and the time $t_2$, and both the control pulse for the first phase exciting coil I and the control pulse for the second phase exciting coil II generate between the time $t_2$ and the time $t_3$. In addition, both the control pulse for the second phase exciting coil II and the control pulse for the third phase exciting coil III generate between the time $t_3$ and the time $t_4$, and both the control pulse for the third phase exciting coil III and the control pulse for the fourth phase exciting coil IV generate between the time $t_4$ and the time $t_5$. Consequently, it will be understood that, after the time $t_2$, the exciting coils I, II, III and IV are driven by a two phase voltage.

Figure 13:
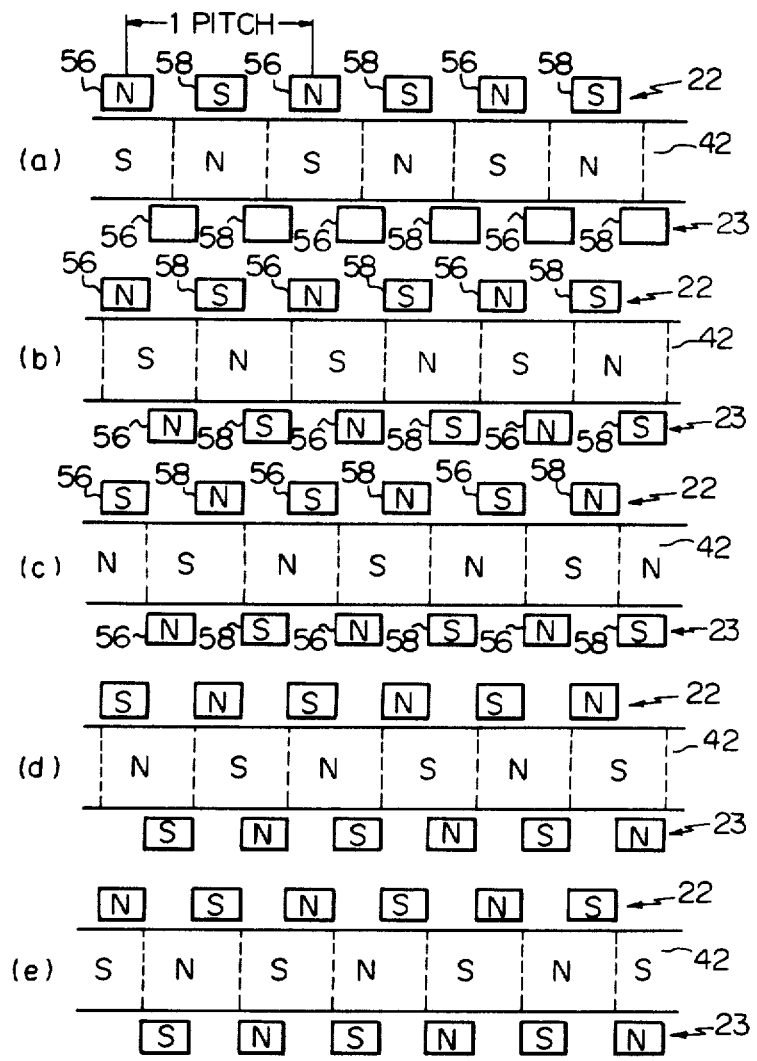
FIG. 13 is a schematically illustrative view of the stator and the rotor of a step motor.

FIG. 13 illustrates a schematic developed view of the outer circumferential surface of the hollow cylindrical outer body 42 of the rotor 21 and the pole pieces 56, 58 of the stators 22, 23. FIG. 13(a) illustrates the case wherein only the first phase exciting coil I is excited as illustrated between the time $t_1$ and the time $t_2$ in FIG. 12. At this time, the polarity of the pole pieces 56 of the stator 22 is N, and the polarity of the pole pieces 58 of the stator 22 is S. Contrary to this, the polarity does not appear on the pole pieces 56, 58 of the stator 23. Consequently, at this time, the rotor 21 remains stopped at a position wherein each of the pole pieces 56 of the stator 22 faces the corresponding S pole of the hollow cylindrical outer body 42, and each of the pole pieces 58 of the stator 22 faces the corresponding N pole of the hollow cylindrical outer body 42. When the second phase exciting coil II is excited, as illustrated between the time $t_2$ and the time $t_3$ in FIG. 12, since the flow direction of the current in the secondary phase exciting coil II is the same as that of the current in the first phase exciting coil I, the polarity of the pole pieces 56 of the stator 23 becomes N, and the polarity of the pole pieces 58 of the stator 23 becomes S, as illustrated in FIG. 13(b). Consequently, at this time, the hollow cylindrical outer body 42 moves to a position wherein each of the S poles of the hollow cylindrical outer body 42 is located between the corresponding pole pieces 56 of the stator 22 and the corresponding pole pieces 56 of the stator 23, and each of the N poles of the hollow cylindrical outer body 42 is located between the corresponding pole pieces 58 of the stator 22 and the corresponding pole pieces 58 of the stator 23. Therefore, assuming that the distance between the adjacent two pole pieces 56 of the stator 22 is one pitch, as mentioned previously, the hollow cylindrical outer body 42 moves by a ¼ pitch towards the right in FIG. 13 from a position illustrated in FIG. 13(a) to a position illustrated in FIG. 13(b).

After this, when the third phase exciting coil III is excited, as illustrated between the time $t_3$ at the time $t_4$, since the flow direction of the current in the third phase exciting coil III is opposite to that of the current in the first phase exciting coil I, the polarity of the pole pieces 56 of the stator 22 becomes S, and the polarity of the pole pieces 58 of the stator 22 becomes N as illustrated in FIG. 13(c). As a result of this, the hollow cylindrical outer body 42 moves by a ¼ pitch towards the right in FIG. 13 from a position illustrated in FIG. 13(b) to a position illustrated in FIG. 13(c). As in the same manner as described above, when the fourth phase exciting coil IV is excited, as illustrated between the time $t_4$ and the time $t_5$ in FIG. 12, the hollow cylindrical outer body 42 moves by a ¼ pitch towards the right in FIG. 13 from a position illustrated in FIG. 13(c) to a position illustrated in FIG. 13(d). After this, when the first phase exciting coil I is excited again, as illustrated between the time $t_5$ and the time $t_6$ in FIG. 12, the hollow cylindrical outer body 42 moves by a ¼ pitch towards the right in FIG. 13 from a position illustrated in FIG. 13(d) to a position illustrated in FIG. 13(e).

As mentioned above, when the exciting coils I, II, III, IV are successively excited from the first phase exciting coil I to the fourth phase exciting coil IV, the hollow cylindrical outer body 42 of the rotor 21 moves relative to the stators 22, 23 and, accordingly, the rotor 21 rotates in one direction. When the rotor 21 rotates, since the external screw threads 29 of the valve shaft 20 is in engagement with the internal screw threads 47 of the hollow cylindrical inner body 40, as illustrated in FIG. 2, the valve shaft 20 is caused to move in one direction, for example, towards the left in FIG. 2. As a result of this, since the cross-sectional area of the annular air flow passage 38 formed between the valve head 36 and the valve seat 19 is increased, in FIG. 1, the amount of air fed via the bypass pipe 16 into the surge tank 2 from the intake duct 3 located upstream of the throttle valve 4 is increased. Contrary to this, in FIG. 11, if, firstly, the control pulse is applied to the base of the transistor $Tr_4$ and then successively applied to the bases of the transistor $Tr_3$, $Tr_2$ and $Tr_1$, the rotor 21 rotates in a direction which is opposite to the rotating direction in the case wherein the control pulse is successively applied to the bases of the transistors $Tr_1$, $Tr_2$, $Tr_3$ and $Tr_4$. As a result of this, since the valve shaft 20 is caused to move towards the right in FIG. 2, the coross-sectional area of the annular air flow passage 38 formed between the valve head 36 and the valve seat 19 is reduced. As mentioned above, the cross-sectional area of the annular air flow passage 38 is controlled by the control pulse produced from the control pulse generating circuit 62 illustrated in FIG. 11. The control pulse generating circuit 62 produces the control pulse in response to, for example, the output signal of an engine rotating speed sensor (not shown), and the amount of air fed into the surge tank 2 via the bypass pipe 16 is increased or reduced so that the number of revolutions per minute of the engine is maintained at a predetermined value.

Referring to FIG. 4, a substantially straight extending water passage 63 is formed in the valve housing 12 in the vicinity of the valve head 36. As illustrated in FIG. 4, a water inlet nipple 64 is fitted into one end of the water passage 63 and connected to, for example, the inside of the water jacket (not shown) formed in the engine body 1. In addition, a water outlet nipple 65 is fitted into the other end of the water passage 63 and connected to, for example, the suction side of the water pump (not shown) for recirculating the cooling water or coolant of the engine. As is well known in the art, the coolant is recirculated to transfer heat from the engine to the environment through the coolant. In this process the coolant becomes hot. Consequently, when the engine is operated, the heated coolant is caused to flow within the water passage 63 and, as a result, the valve housing 12 is heated by the heated coolant. Therefore, since, air, fed into the surge tank 2 from the bypass pipe 16, is heated by the valve housing 12, it is possible to promote the vaporization of fuel injected from the fuel injectors 7 particularly at the time of warm-up of the engine, and it is also possible to prevent the valve head 36 from freezing to the valve seat 19.

In the flow control valve device 8 illustrated in FIG. 2, it is possible to change to the cross-sectional area of the annular air fow passage 38 within a wide range of the cross-sectional area and, therefore, if the cross-sectional area of the annular air flow passage 38 is increased, the amount of air necessary for fast idling can be fed into the surge tank 2 from the bypass pipe 16. Consequently, it is not necessary to form an additional bypass passage in addition to a regular bypass passage as in a conventional idling speed control device. In addition, in the present invention, it is possible to precisely control the cross-sectional area of the annular air flow passage 38 even at the time of fast idling. Furthermore, since the valve head 36 does not come into contact with the valve seat 19, it is impossible for the valve head 36 to become frozen to the valve seat 19. Even if the valve head 36 freezes to the valve seat 19, since the drive force of the valve shaft 20, which force is caused by the step motor 9, is very strong, it is possible to detach the valve head 36 from the valve seat 19. In addition, since the rotation of the rotor 21 is transferred to the valve shaft 20 via a speed reduction mechanism, such as a screw mechanism, it is possible to precisely control the cross-sectional area of the annular air flow passage 38. Furthermore, even if some tolerance is present between the internal screw threads 47 of the hollow cylindrical inner body 40 and the external screw threads 29 of the valve shaft 20, since the valve shaft 20 is always biased towards the right in FIG. 2 due to the spring force of the compression spring 39 which is inserted between the valve head 36 and the end plate 11, no play is present between the external screw threads 29 of the valve shaft 20 and the internal screw threads 47 of the hollow cylindrical innder body 40. Therefore, it is possible to precisely control the cross-sectional area of the annular air flow passage 38. In addition, since users cannot arbitrarily operate the flow control valve device 8 and the drive control device 60, it is possible to maintain the desired operation of such devices 8, 60.

While the invention has been described by reference to a specific embodiment chosen for purposes of the illustration, it should be apparent that numerous modifications could be made thereto by those skilled in the art without departing from the basic concept and scope of the invention.

We claim:

1. An idling speed control device for an internal combustion engine having an intake passage and a throttle valve arranged in the intake passage, said device comprising:

a bypass passage interconnecting the intake passage located upstream of the throttle valve to the intake passage located downstream of the throttle valve;

valve means arranged in said bypass passage and having a control valve controlling a flow area of said bypass passage, said valve means having a valve housing and hot fluid passage means, formed in said valve housing, for conducting a heated fluid; and a stepper motor connected to said control valve for controlling the amount of air flowing within said bypass passage in accordance with a change in the operating condition of said engine at the time of idling, said step motor comprising:

a motor housing, a rotor rotatably arranged in said motor housing, said rotor including a hollow cylindrical outer body made of a permanent magnet, said hollow cylindrical outer body having an outer circumferential wall on which an N pole and an S pole are alternately formed, a hollow cylindrical intermediate body disposed concentrically within said outer body and made of a metallic material, said intermediate body being supported on said motor housing by means of bearings, and a hollow cylindrical inner body made of a synthetic resin and disposed concentrically within said intermediate body, said inner body having a center hole in which internal thread screws are formed, and a valve shaft axially movable in said motor housing, said control valve being fixed onto said valve shaft, said valve shaft having external screw threads which are in rotatable engagement with internal screw threads on said inner body.

2. An idling speed control device as claimed in claim 1, said stator comprises first and second stator cores, each having a stator coil and a plurality of spaced pole pieces which are arranged along an outer circumferential wall of said rotor and are spaced from the outer circumferential wall of said rotor by a slight distance.

3. An idling speed control device as claimed in claim 2, wherein each of the stator coils comprises a winding start terminal, an intermediate tap and an winding end terminal.

4. An idling speed control device as claimed in claim 2, wherein each of said stator cores comprises a first core member having an annular plate, and a second core member having an annular plate, said spaced pole pieces comprising a first pole pieces group extending perpendicular to the annular plate of said first core member from an inner periphery of the annular plate of said first core member, and a second pole piece group extending perpendicular to the annular plate of said second core member from an inner periphery of the annular plate of said second core member, each of the pole pieces of said first pole piece group and each of the pole pieces of said second pole piece group being alternately arranged.

5. An idling speed control device as claimed in claim 2, wherein each of the pole pieces of said first stator core is offset from the corresponding pole piece of said second stator core by a ¼ pitch.

6. An idling speed control device as claimed in claim 1, wherein said valve shaft is non-rotatably supported by said motor housing.

7. An idling speed control device as claimed in claim 1, wherein said valve means comprises a valve chamber formed in said valve housing, and a compression spring arranged in said valve chamber for always biasing said control valve in one direction which has been predetermined.

8. An idling speed control device as claimed in claim 7, wherein said valve chamber has an air inlet and an air outlet cooperating with said control valve, said compression spring being arranged between said control valve and an inner wall of said valve housing for biasing said control valve towards said air outlet.

9. An idling speed control device as claimed in claim 1, wherein said hot fluid passage means is arranged in the vicinity of said control valve.

10. An idling speed control device as claimed in claim 1, wherein the cooling water of the engine is fed into the hot fluid passage means.

* * * * *